United States Patent
Timko et al.

(10) Patent No.: US 11,100,508 B2
(45) Date of Patent: Aug. 24, 2021

(54) MULTI-PARTY PAYMENT CARD PROCESSING SYSTEMS AND METHODS WITH FOREIGN EXCHANGE TRANSACTION DETECTION AND CHARGEBACK LOSS MITIGATION

(71) Applicant: MASTERCARD INTERNATIONAL INCORPORATED, Purchase, NY (US)

(72) Inventors: Michael J. Timko, Holmdel, NJ (US); Wei Xu, Millwood, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 220 days.

(21) Appl. No.: 16/124,004

(22) Filed: Sep. 6, 2018

(65) Prior Publication Data
US 2020/0082406 A1  Mar. 12, 2020

(51) Int. Cl.
*G06Q 20/40* (2012.01)
*G06Q 20/08* (2012.01)

(52) U.S. Cl.
CPC ..... *G06Q 20/4016* (2013.01); *G06Q 20/0855* (2013.01); *G06Q 20/4097* (2013.01)

(58) Field of Classification Search
CPC .......... G06Q 20/0855; G06Q 20/4016; G06Q 20/4097
USPC ....................................................... 705/75
See application file for complete search history.

(56) References Cited

U.S. PATENT DOCUMENTS

| | | | |
|---|---|---|---|
| 6,892,184 B1 | 5/2005 | Komem | |
| 7,464,057 B2 | 12/2008 | Cole | |
| 7,689,483 B2 | 3/2010 | Wu | |
| 7,865,427 B2 | 1/2011 | Wright | |
| 8,626,660 B2 * | 1/2014 | Beck | G06Q 20/10 705/44 |
| 8,740,069 B2 * | 6/2014 | Choy | G06Q 20/12 235/383 |
| 9,984,367 B2 * | 5/2018 | Jain | G06Q 30/06 |
| 2010/0145744 A1 * | 6/2010 | Beck | G07F 7/08 705/5 |
| 2012/0005054 A1 | 1/2012 | Agarwal | |

(Continued)

OTHER PUBLICATIONS

IBM Documentation, "About the ISO8583 sample", retrieved on Apr. 21, 2021, 9 pages (Year: 2021).*

(Continued)

*Primary Examiner* — James D Nigh
(74) *Attorney, Agent, or Firm* — Armstrong Teasdale LLP

(57) ABSTRACT

An electronic payment card processing system and method includes at least one computing device in communication with a multi-party payment processing system and network for processing payment card transactions. The computing device receives transaction data for a plurality of payment card transactions identifies foreign exchange transactions based on the received transaction data, and applies a chargeback loss mitigation rule to filter a chargeback request for a disputed transaction charge that relates to an identified foreign exchange transaction, thereby preventing an unnecessary chargeback for the foreign exchange transaction.

31 Claims, 7 Drawing Sheets

(56) References Cited

U.S. PATENT DOCUMENTS

2013/0212006 A1\* 8/2013 Siddens ............ G06Q 20/4016
705/39
2015/0235206 A1 8/2015 Murphy, Jr.

OTHER PUBLICATIONS

Managed LEI, "What is ISO 20022?", Oct. 1, 2019, retrieved on Apr. 21, 2021 from https://managedlei.com/blog/what-is-iso-20022/, 7 pages (Year: 2019).\*

\* cited by examiner ically to electronic payment systems for payment card transactions, and more specifically to electronic payment card systems and methods with foreign exchange transaction identification and analysis of related chargeback processing requests.

MULTI-PARTY PAYMENT CARD PROCESSING SYSTEMS AND METHODS WITH FOREIGN EXCHANGE TRANSACTION DETECTION AND CHARGEBACK LOSS MITIGATION

BACKGROUND

This disclosure relates generally to electronic payment systems for payment card transactions, and more specifically to electronic payment card systems and methods with foreign exchange transaction identification and analysis of related chargeback processing requests.

Electronic payment card processing systems are in widespread use to process transactions between a payment cardholder and an issuing bank on the one hand, and a merchant and an acquiring bank on the other. The transaction may involve the physical payment card itself at a point-of-sale (POS) terminal, a device associated with a payment card (or an account of a payment card) that includes payment card information and digital payment capability (e.g., a smart phone device including a digital wallet or a dongle), or manually entered payment card information via another device such as a computer device interfacing with a merchant online. Sophisticated multi-party payment card processing systems are known to process payment card transactions, confirm authorized charges, manage payments and the transfers of funds, confirm payment status, and compute available credit balances.

When a cardholder uses a payment card (e.g., a credit card or a debit card) to initiate a transaction to purchase goods or services from a merchant, an acquiring bank (i.e., the merchant's bank) will typically reimburse the merchant for the transaction, less a service fee. The acquiring bank will "settle" the transaction with the issuing bank (i.e., the bank that issued the payment card account used in the transaction) by presenting transaction data to the issuing bank, either directly or, more often, via a payment processor. In a process known as clearing, transaction data is communicated from the acquiring bank to the issuing bank. After clearing, settlement of the final payment occurs. Settlement is a process used to exchange funds between the acquiring bank and the issuing bank for the net value of a batch of all monetary transactions that have cleared for that processing day.

In some cases, after completing a transaction, a cardholder may initiate a transaction dispute, known as a chargeback. The cardholder notifies the issuing bank that the cardholder wishes to dispute the transaction. The issuing bank can then process a chargeback over the payment network, effectively asking for the return of some or all of the funds associated with the disputed transaction. Often the issuing bank will credit the cardholder's payment card account for the amount of the transaction pending resolution of the chargeback dispute. The acquiring bank may honor the chargeback, in which event funds associated with the disputed transaction are returned to the issuing bank from the acquiring bank. The acquiring bank, often after consultation with the merchant, may refuse to honor the chargeback, in which event a third party, such as Mastercard or Visa, will decide whether the chargeback is valid. Depending on the outcome, either the cardholder and the issuing bank or the merchant and the acquiring bank will be assigned responsibility for the cost of the transaction. The chargeback process can be very time consuming and expensive for the multiple parties involved.

Certain types of transactions present an increased likelihood of a chargeback dispute. Specifically, a transaction using a payment card issued in one country to transact with a merchant in a different country presents an increased likelihood of a chargeback dispute. This is because the countries have different currencies and to clear and settle the transaction requires a currency conversion. Since currency conversion rates fluctuate, the conversion rate at the time of transaction may be different from the conversion rate at the time the transaction settles. This, in turn, means that the transaction amount expressed in the currency of the country where the card was issued on the day of the transaction may be different from the transaction amount in that currency on the day the transaction is settled. A cardholder typically is billed monthly by the issuer. When a cardholder sees a transaction charge posted on the bill that differs from the transaction amount on the date of the transaction, the cardholder may dispute the transaction based on a claim that the transaction amount billed is incorrect. The cardholder may genuinely be confused or with bad intent may be taking advantage of an opportunity to seek a chargeback based on a very small transaction amount variance due to currency conversion.

Issuing and acquiring banks are not well positioned to detect or evaluate disputed charges due to foreign currency conversion rates. Furthermore, acquiring banks often are unwilling to fight chargebacks for low value transactions because the cost of fighting is greater than the amount of the disputed transaction. Some cardholders seek to "game" the system by disputing chargebacks based on a price dispute of a few cents. Furthermore, an issuer can set its systems to filter and automatically charge back a transaction when a difference is detected between the transaction amount expressed in the currency used by the issuer on the date of the transaction and the settlement date. When a chargeback is successful, the merchant has lost the value of the goods or services rendered and usually paid a fee to the acquirer triggered by the chargeback. In addition, the acquirer has expended resources to either accept or dispute the chargeback. Undesirable chargebacks and losses accordingly result from disputed charges relating to currency conversions in foreign exchange transactions that are not otherwise problematic. Improvements are desired.

BRIEF DESCRIPTION

In one aspect, the disclosure provides an electronic payment card processing system including at least one host computing device comprising at least one processor in communication with a memory device and a multi-party payment processing system and network for processing payment card transactions. At least one host computing device is configured to: receive transaction data for a plurality of payment card transactions; identify, based on the received transaction data, a foreign exchange transaction between a cardholder and a merchant designated for payment in different currencies and therefore requiring a currency conversion; and apply a chargeback loss mitigation rule to filter a chargeback request for a disputed transaction charge that relates to an identified foreign exchange transaction, thereby preventing an unnecessary chargeback for the foreign exchange transaction.

In another aspect, the disclosure provides a method for electronically responding to disputed charges for payment card transactions processed by a multi-party payment processing system, the method implemented with at least one host computing device having at least one processor in communication with a memory device and the multi-party payment processing system. The method includes: receiving transaction data for a plurality of payment card transactions; identifying, with at least one host computing device and based on the received transaction data, a foreign exchange transaction between a cardholder and a merchant designated for payment in different currencies and therefore requiring a currency conversion; and applying a chargeback loss mitigation rule to filter a chargeback request for a disputed transaction charge that relates to an identified foreign exchange transaction, thereby preventing an unnecessary chargeback for the foreign exchange transaction.

In another aspect, the disclosure provides an electronic payment card processing system including at least one host computing device comprising at least one processor in communication with a memory device and a multi-party payment processing system and network for processing payment card transactions. At least one host computing device is configured to: identify, with at least one host computing device and based on received transaction data for a payment card transaction between a cardholder and a merchant, a foreign exchange transaction; notify the cardholder of the identified foreign exchange transaction; and either before the identified foreign exchange transaction is approved by the multi-party payment processing system or when the identified foreign exchange transaction is disputed by a cardholder, invoke at least one chargeback loss mitigation rule to the identified foreign exchange transaction with the at least one host computing device.

DETAILED DESCRIPTION OF THE DISCLOSURE

Figure 1:
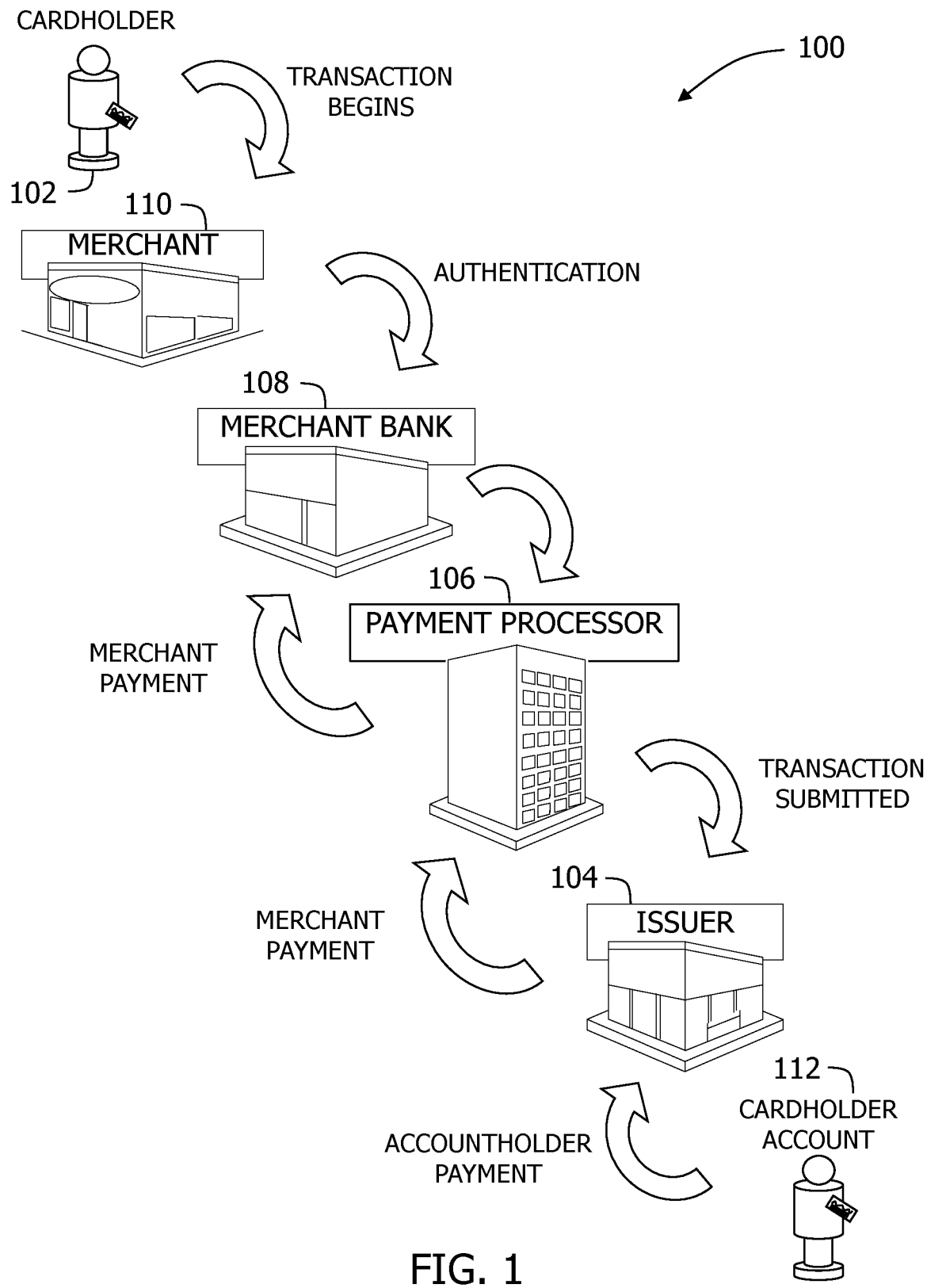
FIG. 1 is a schematic diagram illustrating an exemplary multi-party payment network system for processing payment card transactions.

The following detailed description illustrates embodiments of the disclosure by way of example and not by way of limitation. The description enables one skilled in the art to make and use the disclosure, describes several embodiments, adaptations, variations, alternatives, and uses of the disclosure, including what is presently believed to be the best mode of carrying out the disclosure.

In the payment card processing systems of the disclosure, certain problems and challenges in efficiently identifying foreign exchange transactions, avoiding unnecessary foreign exchange transaction disputes, and assessing or evaluating disputed charges relating to foreign exchange transactions are addressed and overcome. Such problems are described in detail below and include inability to detect or identify foreign currency conversion issues as they arise, inability to evaluate chargeback disputes as valid or possibly fraudulent, and inability to avoid chargeback losses associated with foreign exchange transactions that are not actually problematic.

As discussed, herein a "foreign exchange transaction" shall mean a payment card transaction conducted between a cardholder designated for payment in a first currency (e.g., US dollars) and a merchant designated for payment in a second currency (e.g., Euros, digital currency) that is different from the first currency, and as such the transaction requires a conversion of the transaction amount from the second currency to the first currency at the applicable conversion rate that fluctuates over time. Because the time of actual clearing and settlement of the foreign exchange transaction is subsequent to the time of clearing and settlement on the payment card processing system, the settlement amount that is posted on the cardholder's account may be different from the purchase price at the time of the transaction because a different conversion rate applies at each point in time.

In general, an issuer, on behalf of a cardholder, may initiate a chargeback if the goods or services purchased were either not as described or defective. A typical condition precedent to the chargeback filing is that the cardholder contacted or attempted to contact the merchant to resolve the dispute and the merchant did not honor the terms and conditions of the contract with the cardholder. In a foreign exchange transaction when the payment card (and associated account) used in a transaction is issued in a country other than where the merchant is situated, the issuer may initiate a chargeback due to a de minimus difference between the transaction amount charged by the merchant at the time of the transaction and the transaction amount billed to the cardholder by the issuer. This de minimus difference occurs solely because of a currency conversion at a different time, and thus at a different rate, than what was contemplated at the time of purchase. In view of the mobility of modern cardholders to travel abroad, sometimes to multiple countries in a single trip, and also the ease of completion of so-called card-not-present (CNP) transactions made online or over the phone between cardholders and merchants in different countries without the payment card having to be physically presented, foreign exchange transactions are increasingly common.

As an example of a foreign exchange transaction that presents problems from the chargeback perspective as conventionally implemented, consider a U.S. cardholder that effects an ecommerce (card not present, or CNP) transaction while in the United States with a bookseller situated in Spain. The transaction amount is 20 Euros and the cardholder agrees to pay that amount when purchasing a book. On the day of the transaction the exchange rate is USD 1=0.85 Euro, so the cost of the book is about USD 23.53. The cardholder gets billed by the issuer about a month later and the billed amount is USD 23.50. In this case, the applicable conversation rate at the time of settlement and reflected in the amount the cardholder is billed results in an actual decrease in the purchase amount from the cardholder perspective, although in another example the applicable conversation rate at the time of settlement may result in an increase in the transaction amount from the cardholder perspective.

Since the posted and billed transaction amount is not recognized by the cardholder, the cardholder emails the merchant, complaining that the billed amount for the transaction is not correct. (This may occur even if the converted transaction amount represents a reduction of the purchase price.) The merchant either does not respond or responds that the cardholder agreed to pay 20 Euros. The cardholder then requests that the issuer initiate a chargeback because the merchant refused to adjust the price. The cardholder may or may not be manipulating the system at this point, but at a minimum is inconveniencing the issuer and possibly also inconveniencing both the acquirer and merchant. There is a strong likelihood that an issuer either initiate a chargeback in this scenario. There also is a strong likelihood that the issuer will not initiate a chargeback and simply credit the cardholder the disputed amount rather than risk antagonizing and potentially losing that cardholder. Finally, there is a strong likelihood that, if the issuer does initiate a chargeback, the acquirer simply will accept and assume financial responsibility for the chargeback rather than risk either annoying the merchant or risk having to pay costs associated with losing a chargeback dispute.

A similar scenario may occur as a result of a card present transaction, for example, a U.S. resident purchasing the same book for the same price with a payment card while actually in Spain at the merchant's physical location to make the purchase. If the charges are settled and billed to the cardholder for a different amount because of a change in the currency conversion rate, the cardholder may dispute the charge and, for the reasons mentioned above, there is a strong likelihood that an issuer absorb the loss and there is a strong likelihood that, if a chargeback is initiated, the acquirer absorb the loss rather than passing the loss onto the merchant.

In either of the two scenarios described above, the cardholder actually did purchase a book and the billed transaction amount was not incorrect, but was nonetheless successfully disputed by the cardholder. Such disputed charges could perhaps be disputed successfully in the chargeback process by the issuer, merchant or acquirer, but the financial risk and costs of doing so are high and there are practical difficulties of gathering evidence to dispute the validity of a chargeback. Consequently, the issuer and acquirer may default to accepting the chargeback loss in instances wherein the disputed transaction charges are below a certain amount. In the scenario above, the transaction amount (USD 23.50) for the book simply and practically does not justify the costs of investigating the disputed charges, let alone the costs of gathering evidence and pursuing a chargeback dispute.

Considerations such as those explained above, coupled with a large number of cardholders and a high volume of transactions involving a host of different currencies and conversion rates that frequently change, often result in the issuer bank deciding that absorbing a relatively small loss for occasionally disputed transactions is more financially prudent than incurring the costs of investigation, let alone the costs of contesting the validity of the chargeback. Over a large cardholder base and a large number of transactions for each cardholder, however, such losses in the aggregate and over time can be high, and should be avoided if a practical means of doing so were presented. Of course, such losses are particularly unfortunate when there was no actual problem with the disputed transaction other than a de minimus difference between the transaction amount when the transaction took place and the transaction amount when settled. When the difference between the purchase price and the amount billed to the cardholder is de minimus (e.g., 0.03 USD in the book purchase transaction example set forth above), chargeback losses for disputed charges on this ground are difficult to justify as a business proposition. At present, however, the issuing bank and acquiring bank are not afforded a practical means to avoid chargeback losses.

Additionally, and from the perspective of detecting and thwarting fraudulent disputes of payment card transactions, malicious persons can exploit vulnerabilities in a conventional chargeback system to commit actual fraud and avoid having to pay for purchases by intentionally making foreign exchange transactions in the expectation of being billed for an amount slightly different from the purchase price at the time of the transaction. The malicious cardholders can then dispute the transaction charges with knowledge that either the issuing bank or the acquirer bank is likely to accept the chargeback as a loss. Following the example above, the cardholder may receive a full refund in via the chargeback while keeping the purchased book. Other goods can be acquired in a similar manner by a malicious person using the same or different payment cards.

All parties to the payment system would benefit from improved chargeback systems and processes that discourage the initiation of a chargeback based on a de minimus difference between the transaction amount at the time of the transaction and the transaction amount at the time of settlement. All parties to the payment system—other than malicious cardholders—would benefit from foreign transaction dispute avoidance measures and/or enhanced assessment and resolution of disputes involving foreign exchange transaction currency conversions as well as frustrating and blocking manipulative attempts to exploit conventional chargeback processes relating to foreign exchange transactions.

The systems and methods of the disclosure facilitate automated and streamlined evaluation of disputed charges from the chargeback process perspective by identifying foreign exchange transactions as transactions are made and processed or transactions that have become the subject of a chargeback request. By identifying foreign exchange transactions that are disputed for reason of a discrepancy between the transaction amount at the time of the transaction and the transaction amount at the time of settlement and billing, and disputed for a de minimus difference, resources and costs incurred in connection with foreign exchange transactions can be significantly reduced. This is accomplished by invoking a loss mitigation rule or rules that effectively screen out or disqualify chargebacks based on transaction amount discrepancies when the cardholder has acknowledged there could be a discrepancy and has waived the right to initiate a dispute based on a discrepancy. In other words, the loss mitigation rules provide a pre-chargeback filter that prevents chargebacks attributable to currency conversion issues in foreign exchange transactions from reaching the chargeback process where avoidable losses and related costs could otherwise be incurred.

The systems and methods of the disclosure identify a foreign exchange transaction based on evaluation of transaction data, in particular the bank identification number (BIN) pertaining to the payment card account that is included in the transaction data generated for a payment card transaction. In general, the country in which a payment card is issued, and thus the currency it is issued in, is identified by the primary account number (PAN) or bank identification numbers (BIN). A PAN is usually a 16-digit number associated with an individual payment card, though more or fewer digits are sometimes used. A BIN is the first portion of a PAN and generally identifies the issuer of the payment card. The BIN is the first six digits of a PAN, although additional digits will be used in the future in order to increase the supply of BINs. The issuer may be associated with multiple individual payment cards that share the same BIN. In addition to the BIN, a PAN may include an individual account identifier. The individual account identifier may be of a variable length and generally serves to identify the individual account associated with a payment card.

In the systems and methods of the disclosure, the BIN number in the payment card transaction data may be used to identify a foreign exchange transaction at the point of sale when the payment card is presented to a merchant in a country using a different currency than the currency of the card issuer, The card may be presented in either a face-to-face or in a CNP transaction. For instance, a US cardholder is issued a card having a BIN number that is designated for payment in US dollars, and if the card is presented to a merchant in Spain that does business in Euros, the transaction can be flagged via the BIN number as a foreign exchange transaction when being processed at a POS terminal of the merchant. BIN numbers and merchant ids in the transaction data may be used to identify a foreign exchange transaction that requires a currency conversion. Lookup tables including BINs to identify foreign exchange transactions with respect to any particular merchant can be provided and consulted to identify foreign exchange transactions before they are completed. The system and methods of the disclosure look for a "foreign" BIN that requires a currency conversion in the transaction data with respect to the merchant involved in the transaction. Once a "foreign" BIN is identified, rules to mitigate chargeback losses and appropriate communications with cardholders can be invoked by the systems and methods of the disclosure. Depending on the rule invoked, the systems and methods of the disclosure mitigates chargeback dispute resources and losses as foreign exchange transactions are being made (i.e., prior to completion of the transaction) and/or at the time of a chargeback request after a transaction is completed.

For example, when a chargeback mitigation loss rule is invoked in the systems and methods of the disclosure, an identification of a "foreign" BIN in the received transaction data triggers an additional disclosure to the cardholder before the transaction is completed between the merchant and the cardholder. That is, before the identified foreign exchange transaction is approved on the payment network, the cardholder is notified that the transaction is a foreign exchange transaction subject to a currency conversation that may be settled and billed to the cardholder in a different amount. Associated terms and conditions may be included in the notification or may be separately sent if the cardholder wishes to proceed with the transaction, and the terms and conditions may obviate or accelerate resolution of a subsequent dispute of the transaction charges after the transaction is approved and settled on the multi-party payment processing system and network. As such, the notification and disclosure informs the cardholder of the possibility of a discrepancy between the transaction amount in the local merchant currency at the time of the transaction and the card issuance currency at the time of settlement and billing, establishes that a condition of the transaction is the cardholder's acceptance of that possibility of discrepancy, and requests acknowledgement and acceptance of such discrepancy if it occurs and waiver of any right to dispute the transaction because of such discrepancy. The cardholder, by accepting and acknowledging the disclosure and related terms and conditions, is therefore obligated to accept a discrepancy as a pre-condition to approval of the foreign exchange transaction.

Such notification to and acceptance by the cardholder of a potential currency conversion discrepancy and terms and conditions addressing the same, conducted automatically by the system and methods of the disclosure as foreign exchange transactions are being made, effectively avoids chargeback losses and related costs that would otherwise result if such charges were disputed by cardholders. The foreign exchange transaction notification and acceptance may be presented to the cardholder at a POS terminal and returned to the system by the POS terminal prior to approval of the transaction on the payment network. Such notification in a foreign exchange, CNP transaction may also be made to the cardholder via the electronic device (e.g., a smartphone, tablet, a notebook computer, or another computer device) being used to make the transaction with the merchant and acknowledgment and acceptance from the cardholder may be returned to the system via the same device prior to approval of the transaction on the payment network. In a CNP transaction conducted over the phone, the disclosure may be orally presented to the cardholder with the cardholder orally acknowledging and accepting over the phone.

If the cardholder accepts the terms and conditions of the foreign exchange transaction, which includes the possibility of settlement at an amount different from the purchase price at the time of the transaction, such acceptance is received by the system and methods of the disclosure. Upon receipt of the acceptance by the cardholder, the payment card transaction may proceed to approval and authentication processing on the multi-party payment processing system and network. Upon approval of the transaction, the acceptance of the terms and conditions may be codified as a chargeback remedy flag in the transaction data stored on the system and stored on the system as part of the transaction data for later retrieval and inspection if a chargeback request is later made for the transaction.

Specifically, if the transaction is later subject to a chargeback request by the cardholder, the issuer can retrieve the transaction data and can confirm from the transaction data that the transaction is a foreign exchange transaction and that the cardholder accepted terms and conditions concerning currency conversion and possible discrepancy in the transaction amount due to the conversion. If so confirmed, the system again notifies the cardholder, with appropriate explanation, that the disputed charge relates to a foreign exchange transaction conducted pursuant to the accepted terms and conditions and that the cardholder has waived a right to dispute the transaction due to discrepancy resulting from currency conversion. The system may communicate to the cardholder that if the chargeback request relates solely to the settlement amount it would not be properly disputed and would be rejected, while permitting and inviting the cardholder to submit another chargeback request if there is an alternative basis for the request (e.g., defective goods or non-delivery of goods) that does not relate to a currency conversion reflected in the settlement amount. Instances of chargebacks associated with currency conversions in foreign exchange transactions may be drastically reduced, if not eliminated, and associated losses and costs need not be incurred.

On the other hand, if the cardholder does not accept the terms and conditions for an identified foreign exchange transaction, the transaction may be denied on the payment system and accordingly could not become the subject of a chargeback dispute. Chargeback losses and costs that may have otherwise resulted accordingly cannot accrue. Alternatively, merchant can be given the choice to continue with the authorization process and accept the risk of chargeback related to currency exchange.

The systems and methods of the disclosure, when invoking a chargeback loss mitigation rule, additionally facilitate automated and streamlined chargeback dispute processing that likewise identifies foreign exchange transactions, based on received transaction data, at the time of dispute rather than at the point of sale. For example, the BIN number or the chargeback flag may be used to identify a foreign exchange transaction from the transaction data of the disputed charge as described above. Identification of a foreign BIN in the transaction data triggers a notification to the cardholder that the transaction is a foreign exchange transaction and is subject to currency conversion that would render a chargeback dispute to be inappropriate and subject to rejection if the chargeback dispute is based solely on the settlement amount being different from the purchase price. The cardholder would be permitted and invited, however, to submit further explanation of the basis for the disputed charge or to submit another chargeback request if another basis for the request exists (e.g., defective goods or non-delivery of goods). In this manner, possible confusion by the cardholder concerning a disputed charge is clarified, and in these instances the cardholder may drop the dispute and render a chargeback unnecessary. On the other hand, if the cardholder submits another chargeback request clarification may be made to the issuing and acquiring banks regarding the reason for dispute and appropriate action may be taken in response. Either way, chargeback losses and costs that may otherwise result from disputed foreign exchange transactions may be reduced.

In one embodiment, the disclosure provides an electronic payment card processing system including at least one host computing device comprising at least one processor in communication with a memory device and a multi-party payment processing system and network for processing payment card transactions. At least one host computing device is configured to: receive transaction data for a plurality of payment card transactions; identify, based on the received transaction data, a foreign exchange transaction between a cardholder and a merchant designated for payment in different currencies and therefore requiring a currency conversion; and apply a chargeback loss mitigation rule to filter a chargeback request for a disputed transaction charge that relates to an identified foreign exchange transaction, thereby preventing an unnecessary chargeback for the foreign exchange transaction.

At least one host computing device is also configured to: identify the codified flag for cardholder's acceptance of the terms of foreign exchange transaction, or compare a bank identification number (BIN) to a merchant id in the transaction data to identify the foreign exchange transaction, or identify the foreign exchange transaction in reference to a bank identification number (BIN) lookup table. At least one host computing device may also be configured to invite the cardholder or the issuer to submit another chargeback request that does not relate to the currency conversion and the resultant transaction amount for the identified foreign exchange transaction.

At least one host computing device may likewise be further configured to send, before the identified foreign exchange transaction is approved by the multi-party payment processing system, a disclosure to the cardholder including terms and conditions regarding a possible transaction amount discrepancy due to a required currency conversion; request an acknowledgment and acceptance of the terms and conditions set forth in the disclosure by the cardholder, and upon receipt of the acknowledgement and acceptance by the cardholder, submit the transaction data for the identified foreign exchange transaction to the multi-party payment processing system for approval. At least one host computing device may be configured to codify the receipt of the acknowledgement and acceptance by the cardholder in the transaction data, and store the transaction data including the codified receipt of the acknowledgement and acceptance by the cardholder. At least one host computing device is further configured to retrieve transaction data corresponding to the chargeback request, and determine whether the retrieved transaction data corresponding to the chargeback request includes the codified receipt of the acknowledgement and acceptance by the cardholder in the transaction data. If the retrieved transaction data is determined to include the codified receipt of the acknowledgement and acceptance, at least one host computing device is configured to notify the cardholder or the issuer that the chargeback request relates to the identified foreign exchange transaction and the accepted terms and conditions.

At least one host computing device also may be configured to send a communication to the cardholder or the issuer concerning a possible transaction amount discrepancy due to the required currency conversion in the foreign exchange transaction, and invite the cardholder to submit another chargeback request that does not solely relate to the transaction amount for the identified foreign exchange transaction.

In another embodiment the disclosure provides a method for electronically responding to disputed charges for payment card transactions processed by a multi-party payment processing system, the method implemented with at least one host computing device having at least one processor in communication with a memory device and the multi-party payment processing system. The method includes: receiving transaction data for a plurality of payment card transactions; identifying, with at least one host computing device and based on the received transaction data, a foreign exchange transaction between a cardholder and a merchant designated for payment in different currencies and therefore requiring a currency conversion; and applying a chargeback loss mitigation rule to filter a chargeback request for a disputed transaction charge that relates to an identified foreign exchange transaction, thereby preventing an unnecessary chargeback for the foreign exchange transaction.

The method may also include comparing, by the at least one host computing device, a bank identification number (BIN) to a merchant id in the transaction data to identify the foreign exchange transaction, or identifying, by at least one host computing device, the foreign exchange transaction in reference to a bank identification number (BIN) lookup table. The method also includes inviting the cardholder to submit another chargeback request that does not relate to the currency conversion and the resultant transaction amount for the identified foreign exchange transaction.

The method may additionally include sending, before the identified foreign exchange transaction is approved by the multi-party payment processing system, a disclosure to the cardholder including terms and conditions regarding a possible transaction amount discrepancy due to a required currency conversion. The method includes requesting an acknowledgment and acceptance of the terms of the disclosure by the cardholder, and upon receipt of the acknowledgement and acceptance by the cardholder, submitting the transaction data for the identified foreign exchange transaction to the multi-party payment processing system for approval. The method may include codifying the receipt of the acknowledgement and acceptance by the cardholder in the transaction data, and storing the transaction data including the codified receipt of the acknowledgement and acceptance by the cardholder. The method also includes retrieving transaction data corresponding to the chargeback request, and determining whether the retrieved transaction data corresponding to the chargeback request includes the codified receipt of the acknowledgement and acceptance by the cardholder in the transaction data. If the retrieved transaction data is determined to include the codified receipt of the acknowledgement and acceptance, the method likewise includes notifying the cardholder that the chargeback request relates to the identified foreign exchange transaction and the accepted terms and conditions, and inviting the cardholder to submit another chargeback request that does not solely relate to the transaction amount for the identified foreign exchange transaction.

The method may include sending a communication to the cardholder concerning a possible transaction amount discrepancy due to the required currency conversion in the foreign exchange transaction.

In another embodiment, the disclosure provides an electronic payment card processing system including at least one host computing device comprising at least one processor in communication with a memory device and a multi-party payment processing system and network for processing payment card transactions. At least one host computing device is configured to: identify, with at least one host computing device and based on received transaction data for a payment card transaction between a cardholder and a merchant, a foreign exchange transaction; notify the cardholder of the identified foreign exchange transaction; and either before the identified foreign exchange transaction is approved by the multi-party payment processing system or when the identified foreign exchange transaction is disputed by a cardholder, invoke at least one chargeback loss mitigation rule to the identified foreign exchange transaction with the at least one host computing device.

At least one host computing device may further be configured to, when invoking at least one chargeback loss mitigation rule: send, before the identified foreign exchange transaction is approved by the multi-party payment processing system, a disclosure to the cardholder including terms and conditions regarding a possible transaction amount discrepancy due to a required currency conversion; request an acknowledgment and acceptance of the terms of the disclosure by the cardholder; and upon receipt of the acknowledgement and acceptance by the cardholder, submit the transaction data for the identified foreign exchange transaction to the multi-party payment processing system for approval. At least one host computing device may also be configured to: codify the receipt of the acknowledgement and acceptance by the cardholder in the transaction data; store the transaction data including the codified receipt of the acknowledgement and acceptance by the cardholder; receive a chargeback request from the cardholder; retrieve transaction data corresponding to the chargeback request; and determine whether the retrieved transaction data corresponding to the chargeback request includes the codified receipt of the acknowledgement and acceptance by the cardholder in the transaction data. If the retrieved transaction data is determined to include the codified receipt of the acknowledgement and acceptance, at least one host computing device is further configured to notify the cardholder that the chargeback request relates to the identified foreign exchange transaction and the accepted terms and conditions. At least one host computing device is also configured to invite the cardholder to submit another chargeback request that does not relate to the transaction amount for the identified foreign exchange transaction.

When invoking at least one chargeback loss mitigation rule, at least one host computing device may be configured to receive a chargeback request from the cardholder for a disputed charge in a transaction approved by the multi-party payment processing system; retrieve transaction data corresponding to the chargeback request and the disputed charge in the transaction approved by the multi-party payment processing system; send a communication to the cardholder if, based on the retrieved transaction data, the transaction is identified as a foreign exchange transaction, the communication concerning a possible transaction amount discrepancy due to a required currency conversion; and invite the cardholder to submit another chargeback request that does not relate to the transaction amount for the identified foreign exchange transaction.

At least one host computing device is further configured to compare a bank identification number (BIN) to a merchant id in the transaction data to identify the foreign exchange transaction, or identify the foreign exchange transaction in reference to a bank identification number (BIN) lookup table.

The technical problems addressed by the payment card processing systems and methods of the disclosure include at least one of: (i) efficiently processing foreign exchange transaction processing on a multi-party payment processing system for payment by card transactions; (ii) inefficient chargeback processes in a multi-party payment card processing system with respect to foreign exchange transactions; (iii) inability to assess chargeback requests and avoid unnecessary chargebacks on the multi-party payment processing system with readily available electronic records; (iv) financial loss via vulnerabilities in automated chargeback process in a multi-party payment card processing system; (v) inability to distinguish non-fraudulent charge disputes from fraudulent disputes in the chargeback process of a multi-party payment card processing system; (vi) inability to provide notice, terms and conditions to a cardholder making a foreign exchange transaction; and (vii) inability to efficiently provide cardholder feedback that may avoid disputed charges and chargebacks in a multi-party payment card processing system.

The payment card processing systems and methods of the disclosure to the cardholder may be implemented using computer programming or engineering techniques including computer software, firmware, hardware, or any combination or subset thereof, wherein the technical effects may be achieved by (i) providing a more efficient processing of charges and identification and filtering out of invalid transaction disputes and improved electronic record keeping in a multi-party payment card processing system involving foreign exchange transactions; (ii) provide electronic evidence to evaluate possibly fraudulent charge disputes in a multi-party payment card processing system; (iii) provide electronic retrieval and review of cardholder-accepted terms and conditions for foreign exchange transactions to filter and resolve chargebacks processed in a multi-party payment card processing system with less time and effort and related costs by agents of the multi-party payment card processing system; (iv) providing electronic evidence to filter chargeback rejects in multi-party payment card processing system that are based on foreign exchange transactions that are not problematic; (v) reduce instances of financial loss via vulnerabilities in automated chargeback process in a multi-party payment card processing system; (vi) provide effective notification to cardholders concerning terms applicable to foreign exchange transactions from an educational perspective; and (vii) filter chargeback requests for foreign exchange transactions that are problematic from reaching the chargeback processes that likely will result in loss.

The resulting technical benefits achieved by the payment card processing systems and methods include at least one of: (i) electronic assistance in completing chargeback request assessments in a shorter timeframe; (ii) electronic improvements in detection of foreign exchange transactions in a multi-party payment card processing system; (iii) electronic storage and management of foreign exchange transaction data to implement chargeback loss mitigation measures; (iv) electronic review and filtering of chargeback requests for foreign exchange transactions completed in the multi-party payment card processing system; (v) elimination of electronic vulnerabilities to fraud and financial loss in automated chargeback process in a multi-party payment card processing system; (vi) electronic evidence review of disputed charges and communication of information to a cardholder to avoid unnecessary chargebacks; (vii) electronic evidence review of disputed charges and communication of information to a cardholder that may deter actual fraud; and (viii) increased efficiencies in processing of chargeback requests in a multi-party payment card processing system.

As will be appreciated, based on the description herein the technical improvement in the payment card system as described above is a computer-based solution to a technical deficiency or problem that is itself rooted in computer technology (i.e., the problem itself derives from the use of computer technology). More specifically, the technical problems and inefficiencies created by the conventional fraud detection and chargeback methods and systems within a payment card system are the result of implementation and use of computer devices in facilitating foreign exchange transactions, making required currency conversions, billing and posting transaction charges to card accounts, receiving chargeback requests for disputed charges, processing chargebacks, and disputing chargebacks in multi-party payment card systems and methods. The present invention improves upon the conventional methods and systems in the manner described herein. Thus, the inefficiencies or technical problems created by the conventional processing of foreign exchange transactions and associated chargeback processes and procedures within a multi-party payment card system as described herein are solved (i.e., the desired outcome of achieving increased efficiencies over the conventional processes and procedures are achieved) by the methods and systems described and particularly claimed herein.

Additionally or alternatively, some embodiments potentially reduce a quantity of chargeback requests and/or completions of the chargeback processes that need to be processed. In this manner, the embodiments described herein may facilitate achieving a balance between convenience to the cardholder, the needs of the merchant, issuer and acquirer banks and the resources available in the computing devices included. Additionally, some embodiments may reduce processor load by reducing an amount of data to be analyzed or processed, reduce network bandwidth usage and/or improve communication between systems by reducing an amount of data to be transmitted, improve processor security and/or improve data transmission security. In some embodiments, the subject matter described herein may facilitate increasing processor speed and/or improving operating system resource allocation.

In one embodiment, a computer program is provided, and the program is embodied on a computer-readable medium. In an example embodiment, the system may be executed on a single computer system, without requiring a connection to a server computer. In a further example embodiment, the system may be run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, any type of virtual card (e.g. virtual cards generated by issuers and/or third party processors via mobile bank or desktop apps) and/or any other device that may hold payment account information, such as mobile phones, Smartphones, personal digital assistants (PDAs), key fobs, digital wallets, smart devices (i.e., smart TV) and/or computers. Each type of transactions card can be used as a method of payment for performing a transaction. As used herein, the term "payment account" is used generally to refer to the underlying account with the transaction card. In addition, cardholder card account behavior can include but is not limited to purchases, fund transfer, personal payment, management activities (e.g., balance checking), bill payments, achievement of targets (meeting account balance goals, paying bills on time), and/or product registrations (e.g., mobile application downloads).

As used herein, the term "transaction data" refers to data that includes at least a portion of a cardholder's account information (e.g., cardholder name, account identifier, credit line, security code, and/or expiration data) and at least a portion of purchase information (e.g., price, a type of item and/or service, SKU number, item/service description, purchase date, and/or confirmation number) supplied by a merchant from which the cardholder is making a purchase.

The methods and systems described below overcome the problems and challenges of existing multi-party payment card processing systems and associated chargeback processes concerning foreign exchange transactions and chargeback losses as discussed above and as further described below. Foreign exchange transactions may be identified and communicated to cardholders with effective mitigation of chargeback losses before and after transactions are completed using chargeback loss mitigation rules that identify and filter foreign exchange transaction data from reaching the chargeback process when the foreign exchange transaction data is legitimately objectionable. More efficient chargeback dispute decisions and processing is possible while manipulative fraud is effective presented in CNP and non-CNP transactions.

FIG. 1 is a schematic diagram illustrating an exemplary multi-party payment card processing system 100 for processing and disputing payment card transactions. The present system and method relates to payment card processing system 100, such as a credit card payment network using a payment processor network 106 such as the Mastercard® payment network 106 according to a proprietary communications standard promulgated by Mastercard International Incorporated for the exchange of financial transaction data between financial institutions that are registered with Mastercard International Incorporated. (Mastercard is a registered trademark of Mastercard International Incorporated located in Purchase, N.Y.).

In payment card processing system 100, a financial institution, such as an issuing bank 104, issues a payment card, such as a credit card account or a debit card account, to a cardholder 102, who uses the payment card to tender payment for a purchase from a merchant 110. To accept payment with the payment card, merchant 110 must normally establish an account with a financial institution that is part of the financial payment system. This financial institution is usually called the "merchant bank" or the "acquiring bank" or simply "acquirer". When a cardholder 102 tenders payment for a purchase with a payment card (also known as a financial transaction card), merchant 110 passes authorization request through merchant bank 108 and the payment network 106 to issuer 104 for the amount of the purchase. The request may be performed over the telephone or via a website, but is oftentimes performed through the use of a point-of-sale terminal, which reads the cardholder's account information from the magnetic stripe or the chip on the payment card and communicates electronically with the transaction processing computers of merchant bank 108. Alternatively, merchant bank 108 may authorize a third party to perform transaction processing on its behalf. In this case, the point-of-sale terminal will be configured to communicate with the third party. Such a third party is usually called a "merchant processor" or an "acquiring processor."

Using payment network 106, the computers of merchant bank 108 or the merchant processor will communicate with the computers of issuing bank 104 to determine whether the cardholder's account is in good standing and whether the purchase is covered by the cardholder's available credit line or account balance. Based on these determinations, the request for authorization will be declined or accepted. If the request is accepted, the transaction is given a bank network reference number, such as the Banknet Reference Number used by Mastercard International Incorporated, an authorization code, and/or other transaction identifiers that may be used to identify the transaction.

The payment network may be configured to process authorization messages, such as ISO 8583 compliant messages and ISO® 20022 compliant messages. As used herein, "ISO" refers to a series of standards approved by the International Organization for Standardization (ISO is a registered trademark of the International Organization for Standardization of Geneva, Switzerland). ISO 8583 compliant messages are defined by the ISO 8583 standard which governs financial transaction card originated messages and further defines acceptable message types, data elements, and code values associated with such financial transaction card originated messages. ISO 8583 compliant messages include a plurality of specified locations for data elements. ISO 20022 compliant messages are defined by the ISO 20022 standard. For example, ISO 20022 compliant messages may include acceptor to issuer card messages (ATICA).

During the authorization process of the payment card processing system, the clearing process is also taking place. During the clearing process, merchant bank 108 provides issuing bank 104 with information relating to the sale. No money is exchanged during clearing. Clearing (also referred to as "first presentment") involves the exchange of data required to identify the cardholder's account 112 such as the account number, expiration date, billing address, amount of the sale, and/or other transaction identifiers that may be used to identify the transaction. Along with this data, banks in the United States also include a bank network reference number, such as the Banknet Reference Number used by Mastercard International Incorporated, which identifies that specific transaction. When the issuing bank 104 receives this data, it posts the amount of sale as a draw against the available credit in the cardholder account 112 and prepares to send payment to the merchant bank 108.

When a request for authorization is accepted, the available credit line or available account balance of cardholder's account 112 is decreased. Normally, a charge is not posted immediately to a cardholder's account 112 because bankcard associations, such as Mastercard International Incorporated, have promulgated rules that do not allow a merchant to charge, or "capture," a transaction until goods are shipped or services are delivered. When a merchant 110 ships or delivers the goods or services, merchant 110 captures the transaction by, for example, appropriate data entry procedures on the point-of-sale terminal. If a cardholder 102 cancels a transaction before it is captured, a "void" is generated. If a cardholder 102 returns goods after the transaction has been captured, a "credit" is generated.

After a transaction is captured, the transaction is settled between merchant 110, merchant bank 108, and issuing bank 104. Settlement refers to the transfer of financial data or funds between the merchant's account, merchant bank 108, and issuing bank 104 related to the transaction. Usually, transactions are captured and accumulated into a "batch," which is settled as a group.

Figure 2:
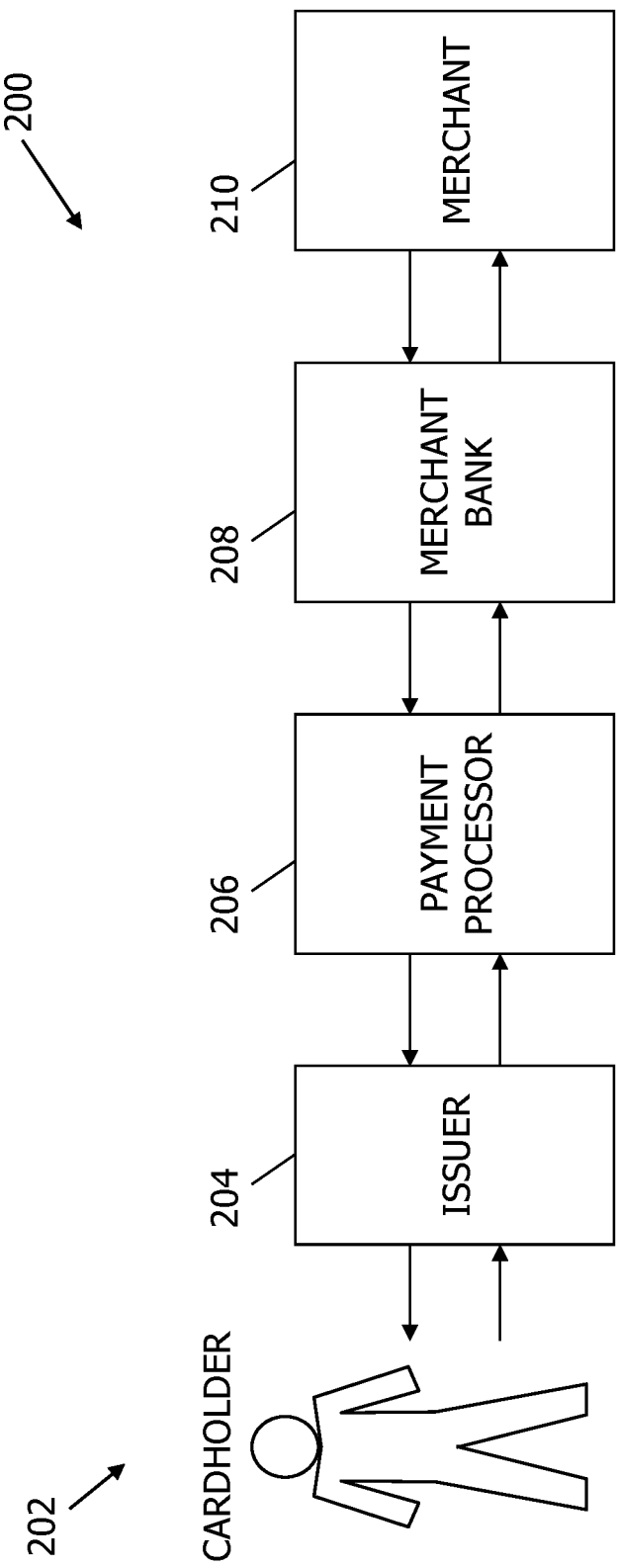
FIG. 2 is a schematic diagram illustrating an exemplary multi-party network system for processing payment card chargebacks.

FIG. 2 is a schematic diagram illustrating an exemplary multi-party network system 200 for processing payment card chargebacks. In one embodiment, system 200 is similar to or the same as system 100 as shown in FIG. 1. In some cases, cardholder 202 disputes a transaction that may have been carried out using payment card processing system 200. A transaction dispute may occur for technical reasons such as insufficient funds, clerical reasons such as duplicate billing and/or incorrect amount billed, quality reasons such as when a cardholder claims to have never received the goods as promised, and/or fraud reasons where a cardholder did not authorize the purchase. A transaction dispute may become a chargeback, and the system of the invention has a particular focus toward identifying foreign exchange transactions and issues they present in the chargeback context.

To initiate a chargeback, cardholder 202 may contact issuing bank 204 to dispute a transaction. Issuing bank 204 submits a chargeback transaction to payment processor 206, which provides clearing and settlement services to its registered users. Payment processor 206 may be the same or similar to the payment processor 106 described in FIG. 1. Payment processor 206 submits the chargeback to merchant bank 208. Merchant bank 208 either resolves the dispute or forwards it to merchant 210. Merchant 210 either accepts the chargeback or re-presents it back to merchant bank 208. If merchant 210 accepts the chargeback, merchant bank 208 forwards the response back to payment processor 206. Payment processor 206 then settles the chargeback with issuing bank 204. If merchant 210 re-presents the chargeback, merchant bank 208 rejects the chargeback requested by issuing bank 204. Merchant bank 208 may provide additional proof or documentation that the transaction was valid. Based on the second presentment, issuing bank 204 either accepts it and takes no further action, or rejects the second presentment, which is a stage referred to as arbitration chargeback. Once arbitration chargeback occurs, neither issuing bank 204 nor merchant bank 208 may initiate any additional chargebacks or presentments. At this point, a case filing is automatically generated with payment processor 206, which issues a financial liability decision regarding the chargeback.

Generally speaking, the chargeback process is complicated, time consuming, and/or costly to all participants involved, except cardholders. Each chargeback transmitted through the payment processor and over the payment network consumes network resources and bandwidth. It would be desirable to streamline or automate aspects of the chargeback process in order to more efficiently decide whether to dispute chargebacks, more efficiently resolve chargeback disputes and/or avoid unnecessary chargebacks and losses.

The systems and processes described thus far present substantial weakness in the chargeback aspects of the system in the foreign exchange transaction scenario, and also substantial vulnerability to malicious persons who may be aware of the difficulties of disputing chargebacks in certain scenarios. Illustrative examples of such weakness and vulnerability are described above. In view of such weakness and vulnerability, conventional payment card processing systems and methods have yet to completely meet the needs of the marketplace in the chargeback aspects described and improvements are desired.

Figure 3:
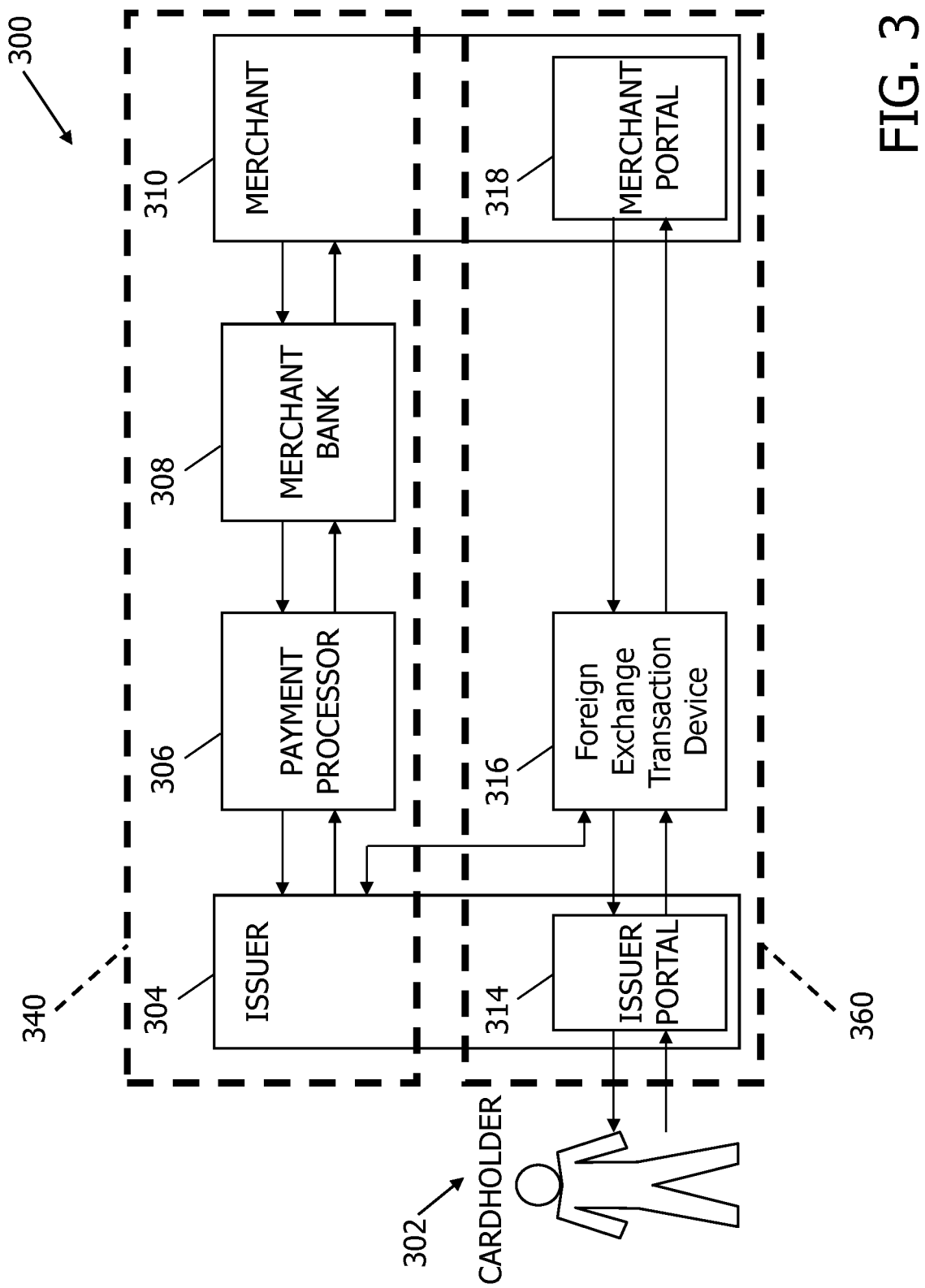
FIG. 3 is a schematic diagram illustrating an exemplary computer system that includes a foreign exchange transaction computing device.

FIG. 3 is a schematic diagram illustrating an exemplary multi-party network system 300 that includes a host foreign exchange transaction computing device 316 and a chargeback communication network 360 for designating and handling transaction disputes as chargebacks. Network system 300 includes a cardholder 302, an issuer 304, a payment processor 306, a merchant bank 308, a merchant 310, an issuer portal 314, the host foreign exchange transaction computing device 316, and a merchant portal 318.

A network 340 is part of a chargeback system that may be similar to the chargeback system 200 described with respect to FIG. 2. Network 360 may be used to resolve transaction disputes designated as chargebacks. Network 340 and network 360 are illustrated as two separate communication networks that are configured to run independently of one another, although they could be combined into one network in another embodiment as desired.

Cardholder 302, using a cardholder computing device, accesses issuer portal 314 to review a cardholder payment transaction history associated with a payment card. The transaction history includes one or more transactions made using the payment card. Cardholder 302 selects a transaction to dispute and transmits the dispute through issuer portal 314. Cardholder 302 may select a dispute button displayed on the user interface of issuer portal 314. Also, the cardholder may identify a disputed transaction via an email message, a phone call, or in an another manner as desired or as permitted.

Issuer portal 314 receives the dispute, including cardholder dispute data. This dispute data also includes transaction data associated with the transaction being disputed. Issuer portal 314 transmits a corresponding dispute message, containing both the cardholder dispute data and associated transaction data, to the host foreign exchange transaction computing device 316. Before actually initiating the chargeback, however, the host foreign exchange transaction computing device or application 316 can apply filtering chargeback loss mitigation rules that may avoid any need to initiate the chargeback for the disputed transaction.

In one embodiment, the host foreign exchange transaction computing device or algorithm 316 identifies foreign exchange transactions as distinguished from other transactions, generates, accepts and stores foreign exchange transaction data that may be used to filter chargeback requests in combination with other transaction data, and to communicate with cardholders concerning foreign exchange transactions to avoid misunderstandings.

Considering the examples discussed above that illustrate difficulties in conventional systems in the context of foreign exchange transactions, the identified foreign exchange transactions and associated foreign exchange transaction data facilitates more or less automated review and decision making whether or not to initiate a chargebacks, or possible to dispute a chargeback depending on the value of the transaction, by a merchant bank, issuer bank, or acquirer bank. Alerts, messages and notifications can be made in the system to avoid confusion and misunderstand that may lead to disputed charges in a foreign exchange transaction, to frustrate manipulative and fraudulent attempts to dispute foreign exchange transactions, and to prevent unnecessary chargebacks from consuming bandwidth and network resources, not to mention financial resources. Alerts, messages and notifications can likewise be automatically generated to representatives of the merchant bank or issuer bank with a recommendation whether or not to dispute a chargeback with supporting evidence or explanation for review by the representatives. The representatives may be given an option to proceed with a dispute (or not) based on the feedback provided by the system that considers foreign exchange transaction data.

Alerts, messages and notifications can likewise be automatically generated to cardholders regarding evidence that may contradict the dispute of charges. The cardholder may be given an option to proceed with a dispute, as long as the dispute is not grounded in a currency conversion issue as described above and further below. Chargeback requests that are solely directed to disputes concerning currency conversions are rejected and filtered from ever reaching the chargeback processes, and chargeback losses are accordingly mitigated.

Figure 4:
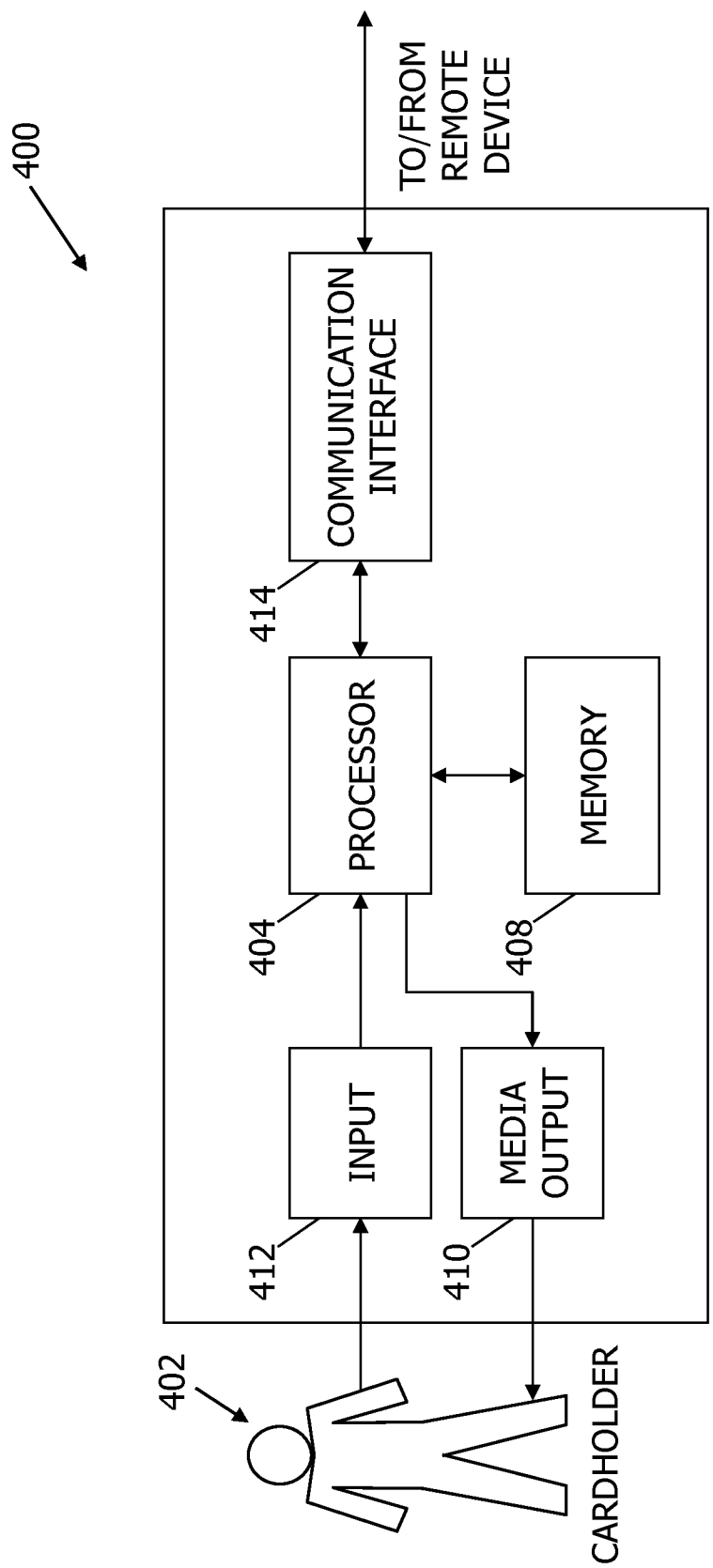
FIG. 4 illustrates an example configuration of a user device for the system shown in FIGS. 1-3.

FIG. 4 illustrates an example configuration of a device 400 operated by a user 402, such as any of the parties described above in the payment network or a cardholder. User device 400 may include, but is not limited to, a smart phone, a tablet, a notebook or laptop computer, a desktop computer, and a website. In the example embodiment, device 400 includes a processor 404 for executing instructions. In some embodiments, executable instructions are stored in a memory area 408. Processor 404 may include one or more processing units, for example, a multi-core configuration. Memory area 408 is any device allowing information such as executable instructions and/or written works to be stored and retrieved. Memory area 408 may include one or more computer readable media.

The device 400 may also include at least one media output component 410 for presenting information to user 402. Media output component 410 is any component capable of conveying information to user 402. In some embodiments, media output component 410 includes an output adapter such as a video adapter and/or an audio adapter. An output adapter is operatively coupled to processor 404 and operatively couplable to an output device such as a display device, a liquid crystal display (LCD), organic light emitting diode (OLED) display, or "electronic ink" display, or an audio output device, a speaker or headphones.

In some embodiments, the device 400 includes an input device 412 for receiving input from user 402. Input device 412 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 410 and input device 412. The device 400 may also include a communication interface 414, which is communicatively couplable to a remote device in the card payment system network or with other remote devices via networks other than the payment system. Communication interface 414 may include, for example, a wired or wireless network adapter or a wireless data transceiver for use with a mobile phone network, Global System for Mobile communications (GSM), 3G, or other mobile data network or Worldwide Interoperability for Microwave Access (WIMAX), or an 802.11 wireless network (WLAN).

Stored in memory area 408 are, for example, computer readable instructions for providing a user interface to user 402 via media output component 410 and, optionally, receiving and processing input from input device 412. A user interface may include, among other possibilities, a web browser and client application. Web browsers enable users, such as user 402, to display and interact with media and other information typically embedded on a web page or a website. An application allows user 402 to interact with a server application from a server system.

Multiple user devices 400 are contemplated and respectively provided for use by cardholders, representatives of the issuer, representatives of the payment processor, representatives of the merchant bank, representatives of the merchant, and possibly others to effect the system as shown in FIG. 3. Additional and/or alternative users and user devices may be provided, however, as desired for use with the system.

In a variety of contemplated examples, different combinations of user devices, being the same or different from one another, may be utilized in the system with otherwise similar effect. One or more of the user devices may be a mobile device, such as any mobile device capable of interconnecting to the Internet including a smart phone, personal digital assistant (PDA), a tablet, or other web-based connectable equipment. Alternatively, one or more of the user devices may be a desktop computer or a laptop computer. Each of the user devices may be associated with a different user as described. Each user device may be interconnected to the Internet through a variety of interfaces including a network, such as a local area network (LAN) or a wide area network (WAN), dial-in connections, cable modems and special high-speed ISDN lines.

Figure 5:
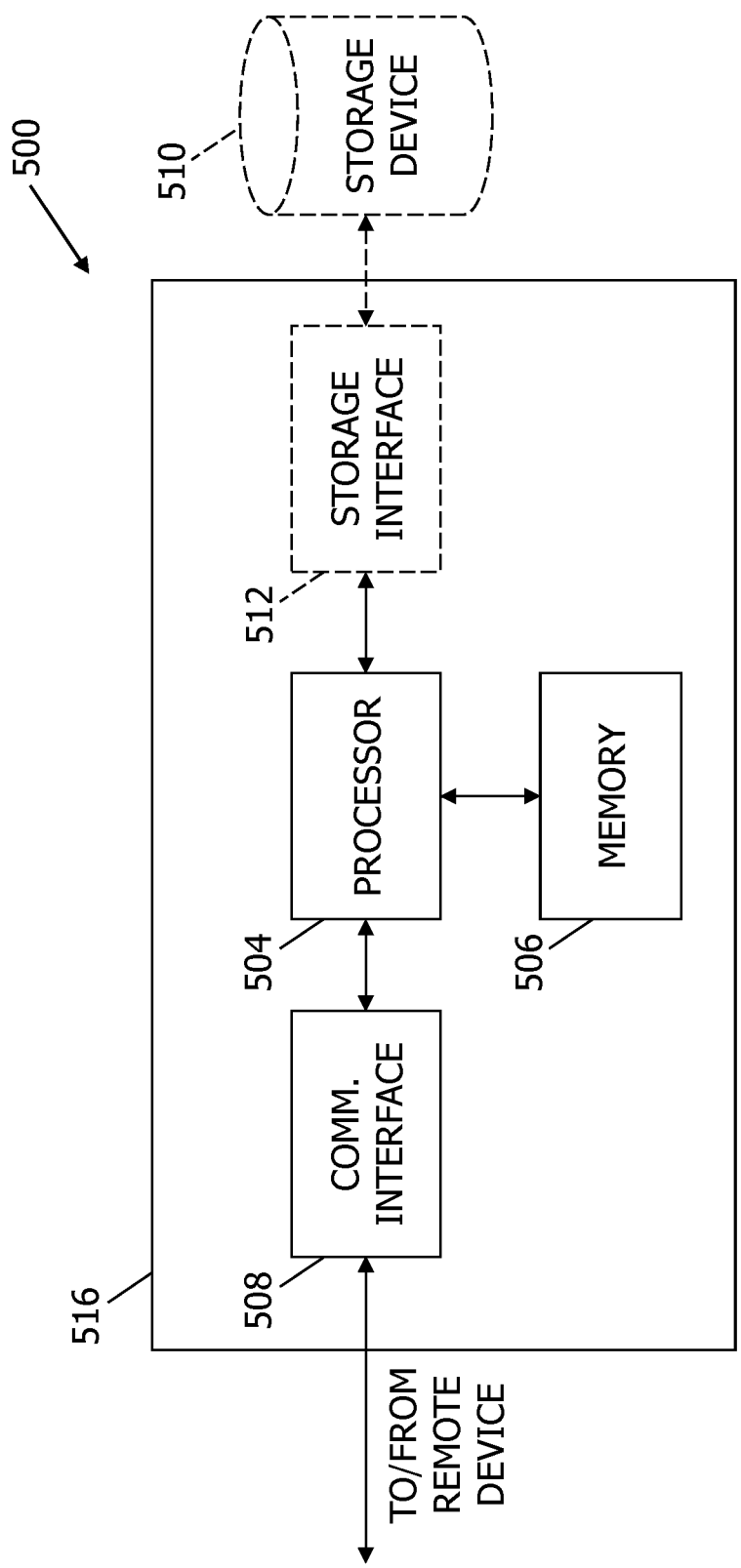
FIG. 5 is a schematic diagram of an example server computing device that may be used with the computer system shown in FIG. 3.

FIG. 5 illustrates an example configuration 500 of a foreign exchange transaction computing device 516 as shown in FIG. 3 that confers foreign exchange transaction identification, generates foreign exchange transaction data, and implements chargeback loss mitigation rules that greatly simplifies chargeback request processing and filtering to prevent unnecessary chargeback requests and avoidable loss. The computing device 516 is sometimes referred to herein as a server-based network "host" device that manages foreign exchange transaction identification, associated foreign exchange transaction data, and invokes the chargeback loss mitigation rules when needed, although it is not strictly necessary in all embodiments that the host computing device is a server system.

As shown in FIG. 5, the host foreign exchange transaction computing device 516 includes a processor 504 for executing instructions. Instructions may be stored in a memory area 506, for example. Processor 504 may include one or more processing units (e.g., in a multi-core configuration).

Processor 504 is operatively coupled to a communication interface 508 such that host foreign exchange transaction computing device 516 is capable of communicating with a remote device such as a merchant portal, an issuing portal, a delivery carrier portal, or a payment processor. For example, communication interface 508 may receive or transmit transaction data, related delivery data, chargeback data and chargeback dispute data to the merchant portal and/or another client device via a network. In some cases the communication interface 508 may also directly communicate with a user device of customer and provide chargeback dispute information, chargeback status information, and/or delivery data and information for the user to decide whether the charges are properly disputed.

Processor 504 may also be operatively coupled to a storage device 510. Storage device 510 is any computer-operated hardware suitable for storing and/or retrieving data. In some embodiments, storage device 510 is integrated in host foreign exchange transaction computing device 516. For example, host foreign exchange transaction computing device 516 may include one or more hard disk drives as storage device 510. In other embodiments, storage device 510 is external to host foreign exchange transaction computing device 516 and may be accessed by a plurality of server computer devices. For example, storage device 510 may include multiple storage units such as hard disks or solid state disks in a redundant array of inexpensive disks (RAID) configuration. Storage device 510 may include a storage area network (SAN) and/or a network attached storage (NAS) system.

The storage device 510 may include a database server and database which contains information and transaction data for enrolled cardholders. In one embodiment, the database is centralized and stored on the server system 500. In an alternative embodiment, the database is stored remotely from the server system 500 and may be non-centralized. The database may store transaction data including data relating to merchants, merchant locations, cardholders, foreign exchange transaction data and data needed for the chargeback loss mitigation rules. The database may include foreign exchange data that is linked to transaction data for ease of access, retrieval and review when considering a possible chargeback dispute in the card payment network. The database may include a plurality of files of information for enrolled cardholders, as well as recorded data regarding disputed charges, disputed chargebacks, success and failure rates of disputes and chargebacks, data relating to possible fraud and actual fraud events, as well as data regarding performance of chargeback loss mitigation rules to mitigate chargeback losses.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory area 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
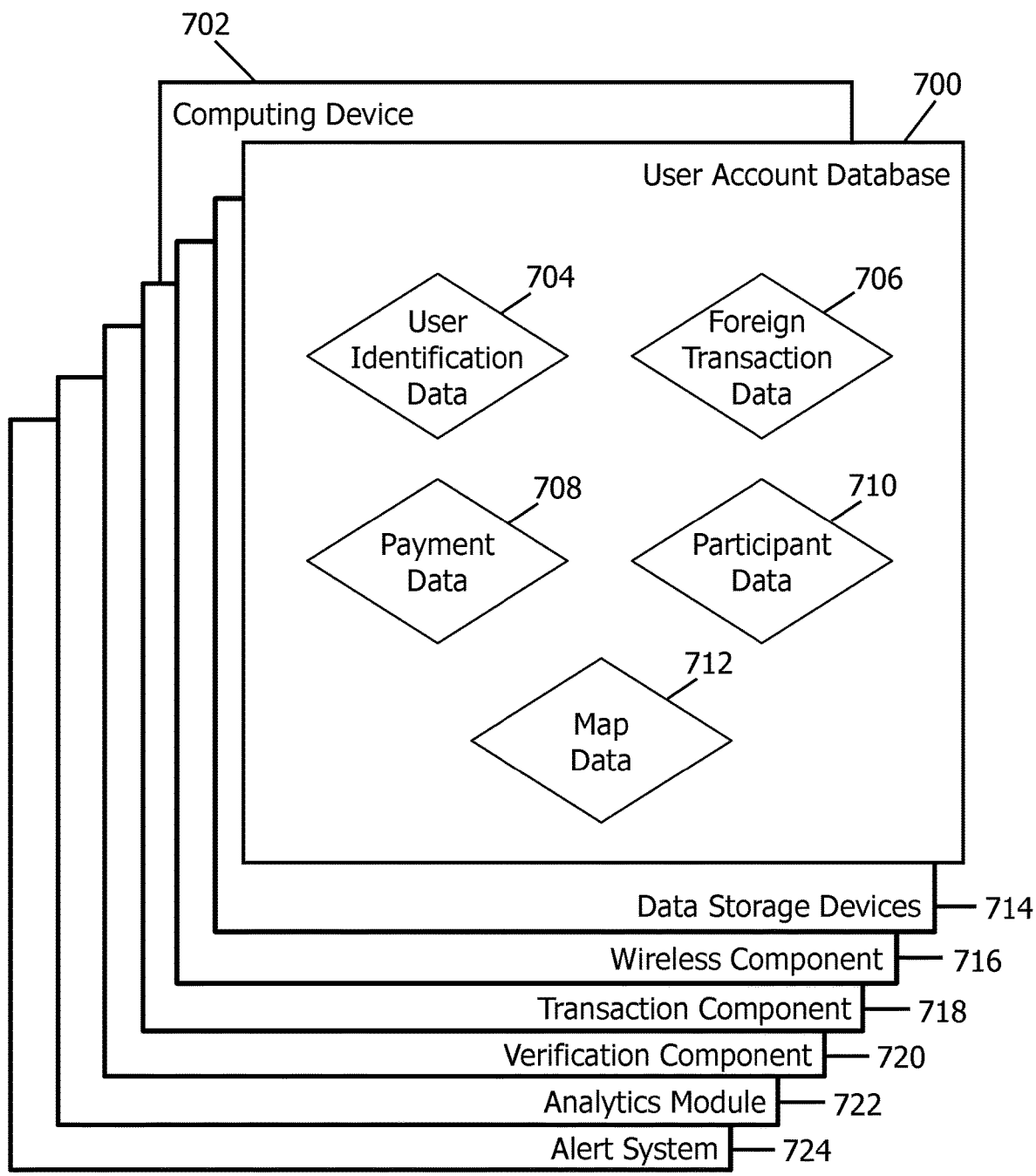
FIG. 6 shows an example configuration of a user account database within a computing device, along with other related computing components, that may be used to create, organize, and monitor a plurality of user data associated with a user.

FIG. 6 shows an example configuration of a user account database 700, within a computing device 702, along with other related computing components, that may be used to create, organize, and monitor a plurality of user data associated with a user account. In some embodiments, computing device 702 is the same or similar to server system 500. User account database 700 is coupled to several separate components within computing device 702, which perform specific tasks.

In the example embodiment, database 700 includes user identification data 704, foreign exchange data 706, payment data 708, participant data 710, and map data 712. In contemplated embodiments, user identification data 704 includes, but is not limited to, a user name, a user address, and a user phone number. Foreign exchange data 706 includes data associated with foreign exchange transaction identification, communication, and filtering of chargeback requests as described herein. Payment data 708 includes, but is not limited to, card information, payment history, and a billing address. Participant data 710 includes information associated with participating merchants, including merchant identifiers, address information, contact information, etc. Map data 712 includes data associated with third party information (e.g., system administrators).

Computing device 702 includes the database 700, as well as data storage devices 714. Computing device 702 also includes a wireless component 716 and a transaction component 718 for correlating, for example, payment card transactions. An analytics module 722 is included for analyzing transactions, enrollment status, the foreign exchange transaction data and chargeback request filtering described herein, time to complete chargeback disputes, success or failure data of chargeback disputes, and other items of interest. Further included is a verification module 720 that may communicate with a device in the payment network or another device, and an alert module 724 for transmitting an alert to a cardholder, merchant or an issuer, or to any other interested party so that possible fraudulent activity may be timely investigated and resolved.

Figure 7:
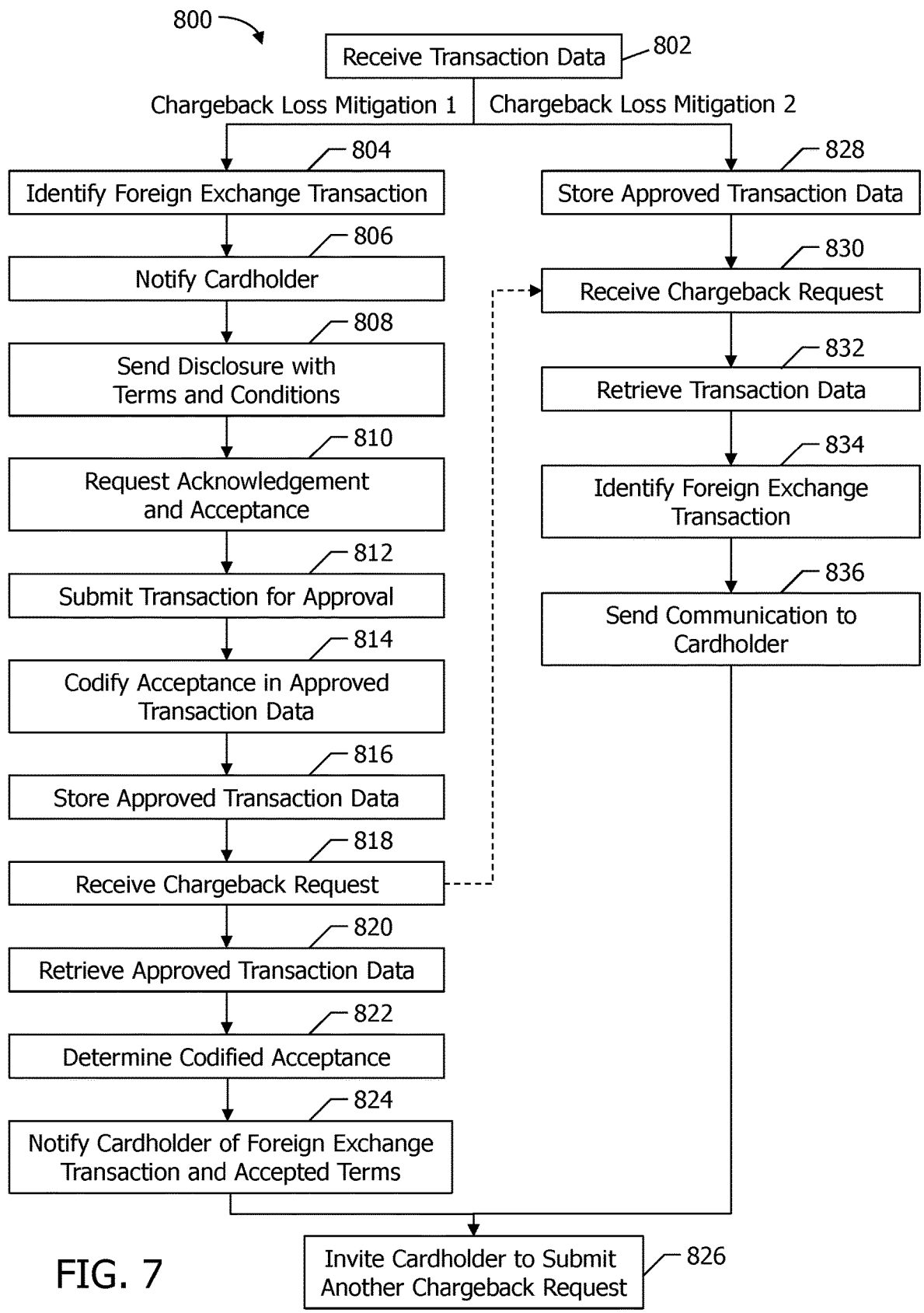
FIG. 7 shows an exemplary process of foreign exchange transaction management for the system shown in FIGS. 1-4.

FIG. 7 shows an exemplary process 800 of invoking chargeback loss mitigation rules for the payment card processing system shown in FIGS. 1-6. In the example shown, the process 800 is implemented by the foreign exchange transaction computing device in communication with the multi-party payment processing system and network for processing payment card transactions, and effectively implements chargeback loss mitigation rules either before the identified foreign exchange transaction is approved by the multi-party payment processing system or when the identified foreign exchange transaction is disputed by a cardholder as explained below.

At step 802 the foreign exchange transaction computing device receives transaction data for a payment card transaction between a cardholder and a merchant. The transaction data received may be for a transaction that has not been approved when Chargeback Loss Rule 1 is invoked, or the transaction data received may be transaction data for an approved transaction processed and approved over the multi-party payment processing system and network when Loss Mitigation Rule 2 is invoked. As will be appreciated, Rules 1 and 2 may be invoked independently as stand-alone chargeback loss mitigation rules, or Rules 1 and 2 may be invoked in combination to accommodate different approaches with a degree of redundancy as desired.

At step 804, the foreign exchange transaction computing device identifies a foreign exchange transaction based on the received transaction data. Such identification of a foreign exchange transaction may be made by comparing a bank identification number (BIN) in the received transaction data to a merchant id in the transaction data, in reference to a bank identification number (BIN) lookup table or in another manner as desired. As discussed above, the foreign exchange transaction computing device aims to find a BIN number that is "foreign" to the merchant involved in the transaction, such that the transaction necessarily involves a currency conversion.

At step 806, the foreign exchange transaction computing device notifies the cardholder of the identified foreign exchange transaction, and at step 808 the foreign exchange transaction computing device sends a disclosure to the cardholder including terms and conditions regarding a possible transaction amount discrepancy due to a required currency conversion. The terms and conditions may optionally include advance acceptance of such discrepancy if it occurs and advance waiver of any right to dispute the transaction because of such discrepancy as a condition to condition to continue with the transaction.

While shown as separate steps, steps 806 and 808 could be effectively combined as desired. As mentioned above, the notification and disclosures with terms and conditions for purposes of steps 806 and 806 may be made in various different forms. For example, the communications of steps 806 and 808 may be generated by the foreign exchange transaction computing device for presentation to the cardholder at a POS terminal. In a CNP transaction, the communications of steps 806 and 808 may be generated by the foreign exchange transaction computing device for presentation to the cardholder may via a cardholder device (e.g., a smartphone, tablet, a notebook computer, or another computer device) being used to make the transaction with the merchant. In a CNP transaction conducted over the phone, the communications of the disclosure may be verbally presented to the cardholder in a spoken manner. The system and methods of the disclosure may include interactive voice recognition (IVR) components and other speech recognition technologies to conduct verbal speech communications with a cardholder in an automated manner as desired.

At step 810 the foreign exchange transaction computing device requests an acknowledgment and acceptance of the disclosure by the cardholder. For example, acknowledgment and acceptance from the cardholder may be returned to the system via cardholder interaction with a POS terminal. Acknowledgment and acceptance from the cardholder may also be returned to the system via the cardholder device and received by the foreign exchange transaction computing device prior to approval of a CNP transaction on the payment network. Acknowledgment and acceptance from the cardholder may likewise be returned with the cardholder verbally acknowledging and accepting over the phone in a spoken manner. Still other types of messaging, communicating, and interacting with the cardholder are possible, but regardless of how this is done the acknowledgment and acceptance must be received by the foreign exchange transaction computing device prior to approval of the transaction on the payment network. If receipt of the acknowledgement and acceptance by the cardholder is not received, the foreign exchange transaction is not submitted to the multi-party payment processing system and accordingly cannot be completed.

Upon receipt of the acknowledgement and acceptance by the cardholder, at step 812 the foreign exchange transaction computing device submits the transaction data for the identified foreign exchange transaction to the multi-party payment processing system for approval. The approval or denial of the payment card transaction then proceeds in a conventional manner on the multi-party payment processing system for approval.

At step 814, the foreign exchange transaction computing device codifies the receipt of the acknowledgement and acceptance by the cardholder in the transaction data, and at step 816 the foreign exchange transaction computing device stores the transaction data including the codified receipt of the acknowledgement and acceptance by the cardholder.

At step 818 the foreign exchange transaction computing device receives a chargeback request from the cardholder. The foreign exchange transaction computing device at step 820 retrieves transaction data corresponding to the chargeback request, and at step 822 determines whether the retrieved transaction data corresponding to the chargeback request includes the codified receipt of the acknowledgement and acceptance by the cardholder in the transaction data.

If the retrieved transaction data is determined to include the codified receipt of the acknowledgement and acceptance at step 822, the foreign exchange transaction computing device notifies the cardholder at step 824 that the chargeback request relates to the identified foreign exchange transaction and was conducted pursuant to the accepted terms and conditions. As such, the chargeback request is deemed inappropriate and is rejected such that no chargeback is actually initiated or performed. In a case wherein the terms and conditions included an advance waiver of disputed charge due to currency conversion, the notification to the cardholder at step 824 may remind the cardholder of the waiver with appropriate explanation.

At step 828 the foreign exchange transaction computing device invites the cardholder to submit another chargeback request that does not relate to the transaction amount for the identified foreign exchange transaction. As such, if the purchased goods are defective or not delivered, or when another legitimate ground to dispute the charge exists, the cardholder's rights to dispute the charge on such grounds are preserved and processed, including any invocation of chargeback procedures described above.

When Chargeback Mitigation Loss Rule 2 is invoked, at step 828 the transaction data for an approved transaction is stored. At step 830 the foreign exchange transaction computing device receives a chargeback request from the cardholder for a disputed charge in a transaction approved by the multi-party payment processing system.

In response to the chargeback request received at step 832, the foreign exchange transaction computing device retrieves transaction data corresponding to the chargeback request and the disputed charge in the transaction approved by the multi-party payment processing system. At step 834 the foreign exchange transaction computing device identifies whether the retrieved transaction is a foreign exchange transaction based on the retrieved transaction data. Such identification may be based on the BIN number per the discussion above.

If a foreign exchange transaction is identified, at step 834 the foreign exchange transaction computing device at step 836 sends a communication to the cardholder concerning a possible transaction amount discrepancy due to a required currency conversion. The communication of step 836 may be generated and presented to the cardholder in any of the forms described above, or in another manner as desired. The foreign exchange transaction computing device also at step 826 invites the cardholder to submit another chargeback request that does not relate to the transaction amount for the identified foreign exchange transaction, and if another legitimate basis for dispute exists it may be accepted and processed including invocation of chargebacks as discussed above. While steps 826 and 836 are separately shown and described, they could be effectively combined as desired.

From step 826, which is shared by both the first and second chargeback loss mitigation rules in FIG. 7, if another chargeback request is submitted, it may proceed to the chargeback process, including dispute of the chargeback and evaluated in response in a conventional manner. The chargeback request that prompted the communication at step 826 is cancelled, however. Either of the two chargeback loss mitigation rules acts on an identified foreign exchange transaction (step 804 in Rule 1 or step 834 in rule 2) from the transaction data received at step 802 which applies to both Rules 1 and 2. Either of the two chargeback loss mitigation rules also communicates with a cardholder (at steps 834 and 836) that the chargeback request will not be accepted if it relates solely to the settlement amount from a currency conversion at another conversion rate than the rate applicable at the time of purchase. Rules 1 and 2 effectively provide a filter to chargeback requests that preclude foreign exchange transactions from entering the chargeback process unless there is an objection or ground for dispute that does not relate to a currency conversion issue in the settled transaction amount.

As will be appreciated based on the foregoing specification, the above-described embodiments of the disclosure may be implemented using computer programming or engineering techniques including computer software, firmware, hardware or any combination or subset thereof, wherein the technical effects described above are achieved. Any such resulting program, having computer-readable code, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electronic payment card processing system for reducing consumption of network bandwidth of a payment processing network, the electronic payment card processing system comprising:

the payment processing network configured to:
route messages between issuer computing devices and merchant bank computing devices, wherein the payment processing network requires the messages to be formatted according to a proprietary standard associated with payment card transactions, the proprietary standard defining message types, data elements, and code values for the messages; and
implement a payment-network chargeback process in response to chargeback transaction messages received from the issuer computing devices, the payment-network chargeback process including, for each chargeback transaction message received by the payment processing network, multiple messages routed via the payment processing network between a respective issuer computing device and a respective merchant bank computing device; and at least one host computing device comprising at least one processor in communication with a memory device and the payment processing network, wherein the at least one processor is configured to:
receive transaction data for a plurality of payment card transactions processed over the payment processing network;
identify, based on the received transaction data, a plurality of foreign exchange transactions, each foreign exchange transaction occurring between a respective cardholder and a respective merchant and designated for payment by the respective cardholder to the respective merchant in different currencies and therefore requiring a currency conversion;
receive, through an issuer portal associated with one of the issuer computing devices, via a second network different from the payment processing network, a dispute message identifying a disputed transaction of the plurality of payment card transactions;
apply a chargeback loss mitigation rule to filter the dispute message against the identified foreign exchange transactions;
in response to the dispute message passing the filter, submit a chargeback transaction message for the disputed transaction to the payment processing network for processing via the payment-network chargeback process; and
in response to the filter capturing the dispute message, reject the dispute message without submitting the chargeback transaction message to the payment processing network, thereby preventing the dispute message from entry into the payment-network chargeback process.

2. The system of claim 1, wherein the at least one host computing device is configured to:
compare a bank identification number (BIN) to a merchant id in the transaction data to identify one of the foreign exchange transactions.

3. The system of claim 1, wherein the at least one host computing device is configured to:
identify one of the foreign exchange transactions in reference to a bank identification number (BIN) lookup table.

4. The system of claim 1, wherein the at least one host computing device is further configured to:
invite the respective cardholder to submit another dispute message that does not relate to a currency conversion and a resultant change in transaction amount for one of the identified foreign exchange transactions.

5. The system of claim 1, wherein the at least one host computing device is further configured to:
send, before the identified foreign exchange transactions are approved by the payment processing network, a disclosure to the respective cardholder including terms and conditions regarding a possible transaction amount discrepancy due to a required currency conversion.

6. The system of claim 5, wherein the at least one host computing device is further configured to:
request an acknowledgment and acceptance of the disclosure by the respective cardholder; and
upon receipt of the acknowledgement and acceptance by the respective cardholder, submit the transaction data for the identified foreign exchange transactions to the payment processing network for approval.

7. The system of claim 6, wherein the at least one host computing device is further configured to:
codify the receipt of the acknowledgement and acceptance by the respective cardholder in the transaction data; and
store the transaction data including the codified receipt of the acknowledgement and acceptance by the respective cardholder.

8. The system of claim 7, wherein the at least one host computing device is further configured to:
retrieve the transaction data corresponding to the dispute message; and
determine whether the retrieved transaction data corresponding to the dispute message includes the codified receipt of the acknowledgement and acceptance by the respective cardholder in the transaction data.

9. The system of claim 8, wherein the at least one host computing device is further configured to:
if the retrieved transaction data corresponding to the dispute message is determined to include the codified receipt of the acknowledgement and acceptance, notify the respective cardholder that the dispute message relates to one of the identified foreign exchange transactions and the terms and conditions regarding the possible transaction amount discrepancy due to the required currency conversion.

10. The system of claim 1, wherein the at least one host computing device is further configured to:
invite the respective cardholder to submit another dispute message that does not solely relate to a transaction amount for one of the identified foreign exchange transactions.

11. The system of claim 1, wherein the at least one host computing device is further configured to:
send a communication to the respective cardholder concerning a possible transaction amount discrepancy due to a required currency conversion in one of the foreign exchange transactions.

12. A method for reducing consumption of network bandwidth of a payment processing network, the method implemented by an electronic payment card processing system including the payment processing network and at least one host computing device having at least one processor in communication with a memory device and the payment processing network, the method comprising:
routing, by the payment processing network, messages between issuer computing devices and merchant bank computing devices, wherein the payment processing network requires the messages to be formatted according to a proprietary standard associated with payment card transactions, the proprietary standard defining message types, data elements, and code values for the messages; and
implementing, by the payment processing network, a payment-network chargeback process in response to chargeback transaction messages received from the issuer computing devices, the payment-network chargeback process including, for each chargeback transaction message received by the payment processing network, multiple messages routed via the payment processing network between a respective issuer computing device and a respective merchant bank computing device;
receiving, by the at least one processor, transaction data for a plurality of payment card transactions processed over the payment processing network;
identifying, the at least one processor and based on the received transaction data, a plurality of foreign exchange transactions, each foreign exchange transaction occurring between a respective cardholder and a respective merchant and designated for payment by the respective cardholder to the respective merchant in different currencies and therefore requiring a currency conversion;
receiving, by the at least one processor and through an issuer portal via a second network different from the payment processing network, a dispute message identifying a disputed transaction of the plurality of payment card transactions;
applying a chargeback loss mitigation rule to filter the dispute message against the identified foreign exchange transactions;
in response to the dispute message passing the filter, submitting a chargeback transaction message for the disputed transaction to the payment processing network for processing via the payment-network chargeback process; and
in response to the filter capturing the dispute message, rejecting the dispute message without submitting the chargeback transaction message to the payment processing network, thereby preventing the dispute message from entry into the payment-network chargeback process.

13. The method of claim 12, further comprising:
comparing, by the at least one host computing device, a bank identification number (BIN) to a merchant id in the transaction data to identify one of the foreign exchange transactions.

14. The method of claim 12, further comprising:
identifying, by the at least one host computing device, one of the foreign exchange transactions in reference to a bank identification number (BIN) lookup table.

15. The method of claim 12, further comprising:
inviting, by the at least one host computing device, the respective cardholder to submit another dispute message that does not relate to a currency conversion and a resultant change in transaction amount for one of the identified foreign exchange transactions.

16. The method of claim 12, further comprising:
sending, by the at least one host computing device and before the identified foreign exchange transactions are approved by the payment processing network, a disclosure to the respective cardholder including terms and conditions regarding a possible transaction amount discrepancy due to a required currency conversion.

17. The method of claim 16, further comprising:
requesting, by the at least one host computing device, an acknowledgment and acceptance of the disclosure by the respective cardholder; and
upon receipt of the acknowledgement and acceptance by the respective cardholder, submitting, by the at least one host computing device, the transaction data for the identified foreign exchange transactions to the payment processing network for approval.

18. The method of claim 17, further comprising:
codifying, by the at least one host computing device, the receipt of the acknowledgement and acceptance by the respective cardholder in the transaction data; and
storing, by the at least one host computing device, the transaction data including the codified receipt of the acknowledgement and acceptance by the respective cardholder.

19. The method of claim 18, further comprising:
retrieving, by the at least one host computing device, transaction data corresponding to the dispute message; and
determining, by the at least one host computing device, whether the retrieved transaction data corresponding to the dispute message includes the codified receipt of the acknowledgement and acceptance by the respective cardholder in the transaction data.

20. The method of claim 19, further comprising:
if the retrieved transaction data is determined to include the codified receipt of the acknowledgement and acceptance, notifying, by the at least one host computing device, the respective cardholder that the dispute message relates to one of the identified foreign exchange transactions and the terms and conditions regarding the possible transaction amount discrepancy due to the required currency conversion.

21. The method of claim 12, further comprising:
inviting, by the at least one host computing device, the respective cardholder to submit another dispute message that does not solely relate to a transaction amount for one of the identified foreign exchange transactions.

22. The method of claim 12, further comprising:
sending, by the at least one host computing device, a communication to the respective cardholder concerning a possible transaction amount discrepancy due to a required currency conversion in one of the foreign exchange transactions.

23. An electronic payment card processing system for reducing consumption of network bandwidth of a payment processing network, the electronic payment card processing system comprising:
the payment processing network configured to:
route messages between issuer computing devices and merchant bank computing devices, wherein the payment processing network requires the messages to be formatted according to a proprietary standard associated with payment card transactions, the proprietary standard defining message types, data elements, and code values for the messages; and
implement a payment-network chargeback process in response to chargeback transaction messages received from the issuer computing devices, the payment-network chargeback process including, for each chargeback transaction message received by the payment processing network, multiple messages routed via the payment processing network between a respective issuer computing device and a respective merchant bank computing device; and
at least one host computing device comprising at least one processor in communication with a memory device and the payment processing network, wherein the at least one processor is configured to:
receive transaction data for a plurality of payment card transactions processed over the payment processing network;
identify, based on the received transaction data, a plurality of foreign exchange transactions, each foreign exchange transaction occurring between a respective cardholder and a respective merchant and designated for payment by the respective cardholder to the respective merchant in different currencies and therefore requiring a currency conversion;
notify the respective cardholder of the respective identified foreign exchange transaction;
receive, through an issuer portal associated with one of the issuer computing devices, via a second network different from the payment processing network, a dispute message identifying a disputed transaction of the plurality of payment card transactions;
either before the respective identified foreign exchange transaction is approved by the payment processing network or when the respective identified foreign exchange transaction is disputed by the respective cardholder, apply a chargeback loss mitigation rule to filter the dispute message against the identified foreign exchange transactions;
in response to the dispute message passing the filter, submit a chargeback transaction message for the disputed transaction to the payment processing network for processing via the payment-network chargeback process; and
in response to the filter capturing the dispute message, reject the dispute message without submitting the chargeback transaction message to the payment processing network, thereby preventing the dispute message from entry into the payment-network chargeback process.

24. The system of claim 23, wherein the at least one host computing device is further configured to, when applying the chargeback loss mitigation rule:
send, before the identified foreign exchange transactions are approved by the payment processing network, a disclosure to the respective cardholder including terms and conditions regarding a possible transaction amount discrepancy due to a required currency conversion.

25. The system of claim 24, wherein the at least one host computing device is further configured to:

request an acknowledgment and acceptance of the disclosure by the respective cardholder; and upon receipt of the acknowledgement and acceptance by the respective cardholder, submit the transaction data for the identified foreign exchange transactions to the payment processing network for approval;

codify the receipt of the acknowledgement and acceptance by the respective cardholder in the transaction data; and store the transaction data including the codified receipt of the acknowledgement and acceptance by the respective cardholder.

26. The system of claim 25, wherein the at least one host computing device is further configured to:

receive the dispute message from the respective cardholder;

retrieve the transaction data corresponding to the dispute message; and determine whether the retrieved transaction data corresponding to the dispute message includes the codified receipt of the acknowledgement and acceptance by the respective cardholder in the transaction data.

27. The system of claim 26, wherein the at least one host computing device is further configured to:

if the retrieved transaction data is determined to include the codified receipt of the acknowledgement and acceptance, notify the respective cardholder that the dispute message relates to one of the identified foreign exchange transactions and the terms and conditions regarding the possible transaction amount discrepancy due to the required currency conversion.

28. The system of claim 27, wherein the at least one host computing device is further configured to:

invite the respective cardholder to submit another dispute message that does not relate to a transaction amount for the one of the identified foreign exchange transactions.

29. The system of claim 23, wherein the at least one host computing device is further configured to, when applying the chargeback loss mitigation rule:

receive the dispute message from the respective cardholder for a disputed charge in a transaction approved by the payment processing network;

retrieve the transaction data corresponding to the dispute message and the disputed charge in the transaction approved by the payment processing network;

send a communication to the respective cardholder if, based on the retrieved transaction data, the transaction is identified as one the foreign exchange transactions, the communication concerning a possible transaction amount discrepancy due to a required currency conversion; and invite the respective cardholder to submit another dispute message that does not relate to the possible transaction amount discrepancy for the one of the identified foreign exchange transactions.

30. The system of claim 23, wherein the at least one host computing device is further configured to:

compare a bank identification number (BIN) to a merchant id in the transaction data to identify the foreign exchange transactions.

31. The system of claim 23, wherein the at least one host computing device is further configured to:

identify the foreign exchange transactions in reference to a bank identification number (BIN) lookup table.

* * * * *